United States Patent Office 3,838,121
Patented Sept. 24, 1974

3,838,121
2-(AMINOALKYL-AMINO)-4-AMINO THIENO
[3,2-d]PYRIMIDINES
Eberhard Woitun, Berthold Narr, and Wolfgang Schroter,
Biberach an der Riss, Germany, assignors to Boehringer
Ingelheim GmbH, Ingelheim am Rhein, Germany
No Drawing. Filed Aug. 4, 1970, Ser. No. 60,933
Claims priority, application Germany, Aug. 8, 1969,
P 19 40 572.2; July 2, 1970, P 20 32 686.7,
P 20 32 687.8
Int. Cl. C07d 87/46
U.S. Cl. 260—247.1          10 Claims

ABSTRACT OF THE DISCLOSURE 2-(aminoalkylamino)-thieno [3,2-d]pyrimidines of the formula

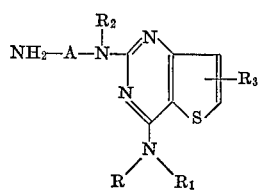

I wherein R and $R_1$ may be the same or different and are selected from the group consisting of hydrogen and straight and branched alkyl of 1 to 6 carbon atoms and taken together with the nitrogen atom to which they are attached form a saturated 5 to 7 member heterocyclic ring which can optionally contain an oxygen or nitrogen heteroatom and may be substituted with alkyl of 1 to 6 carbon atoms or hydroxyl, $R_2$ is selected from the group consisting of hydrogen and straight and branched alkyl of 1 to 6 carbon atoms, $R_3$ is selected from the group consisting of methyl in the 6- or 7-position and hydrogen and A is a straight or branched alkylene of 2 to 10 carbon atoms and their non-toxic, pharmaceutically acceptable acid addition salts which possess cardiovascular and sedative activity and inhibit platelet aggregation, and processes for their preparation.

OBJECTS OF THE INVENTION

It is an object of the invention to provide the novel thieno [3,2-d] pyrimidines of formula I and their addition salts.

It is a further object of the invention to provide novel processes for the preparation of the compounds of formula I.

It is another object of the invention to provide novel therapeutic compositions for inhibiting platelet aggregation.

It is an additional object of the invention to provide a novel method of inhibiting platelet aggregation in warm-blooded animals.

These and other objects and advantages of the invention will become obvious from the following detailed description.

The novel 2-(aminoalkylamino)-thieno [3,2-d] pyrimidines of the invention are selected from the group consisting of compounds of the formula

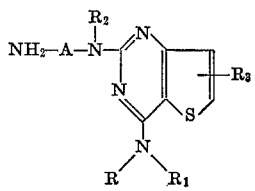

I wherein R and $R_1$ may be the same or different and are selected from the group consisting of hydrogen and straight and branched alkyl of 1 to 6 carbon atoms and taken together with the nitrogen atom to which they are attached form a saturated 5 to 7 member heterocyclic ring which can optionally contain an oxygen or nitrogen heteroatom and may be substituted with alkyl of 1 to 6 carbon atoms or hydroxyl, $R_2$ is selected from the group consisting of hydrogen and straight and branched alkyl of 1 to 6 carbon atoms, $R_3$ is selected from the group consisting of a methyl in the 6- or 7-position and hydrogen and A is a straight or branched alkylene of 2 to 10 carbon atoms and their non-toxic, pharmaceutically acceptable acid addition salts. Among the preferred compounds of formula I are those where R and $R_1$, together with the nitrogen atom to which they are attached, form a morpholino ring optionally substituted with a methyl group.

The acid addition salts of the thieno [3,2-d] pyrimidines of formula I may be derived from non-toxic, pharmaceutically acceptable inorganic acids such as hydrochloric acid, sulfuric acid, phosphoric acid, etc., and organic acids such as succinic acid, tartaric acid, maleic acid, fumaric acid, etc.

The novel thieno [3,2-d] pyrimidines of formula I may be made by the following methods.

METHOD A

By reaction of a compound of the general formula

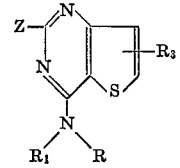

II wherein R, $R_1$ and $R_3$ have the above meanings and Z is a halogen atom, a substituted mercapto group or an alkylsulfonyl group with a diamine of the formula

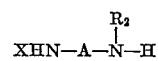

II wherein $R_2$ and A are as defined above and X is a hydrogen atom or a protecting group easily split off, for example, acetyl, benzoyl or p-toluenesulfonyl group, and optionally splitting off the protecting group X. If the radical Z is a halogen atom, the presence of a hydrogen halide binding agent is required.

The reaction is performed at temperatures between 20 and 200° C., preferably in the presence of an organic solvent. The hydrogen halide binding agent may be an inorganic or tertiary organic base. There may, however, also be used at least a molar excess of the employed diamine of general formula III as acid binding agent. A further excess of the diamine may serve as the solvent. If X represents a protecting group, this is split off subsequently, for example by means of hydrolysis.

METHOD B

By reaction of a compound of the formula

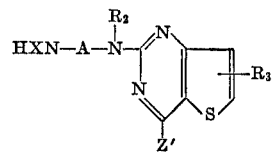

IV wherein the radicals $R_2$, $R_3$ X and A have the above meanings and Z' is a halogen atom, a free or substituted mercapto group or an alkylsulfonyl group with an amine of the formula

V wherein $R_1$ and R are as defined above, and optionally splitting off a protecting group X. If Z' is a halogen atom, the presence of a hydrogen halide binding agent is required for the reaction.

The reaction is performed at temperatures between 20 and 200° C., preferably in the presence of an organic solvent. The hydrogen halide binding agent may be an inorganic or tertiary organic base. There may, however, also be used at least one molar excess of the employed amine as acid binding agent. A further excess of this amine may serve as the solvent. If X is a protecting group, this is optionally subsequently split off, for example by means of hydrolysis.

METHOD C

By reaction of a compound of the formula

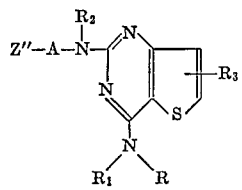
VI wherein the radicals R to $R_3$ and A are defined as above and Z" is a halogen atom, with ammonia or with a carboxylic acid amide or a carboxylic acid imide or their metal salts and by subsequent splitting off of the acid group from the originating carboxylic acid derivative.

The reaction is performed at temperatures between 20 and 200° C., preferably in the presence of an organic solvent. When reacting with ammonia, the reaction is preferably used with an excess of ammonia and the reaction is carried out in a closed vessel. The carboxylic acid derivative formed when using a carboxylic acid amide or imide is split with acids or bases. Bases especially suitable are hydrazine and hydroxylamine.

METHOD D

By catalytic reduction of a nitrile of the formula

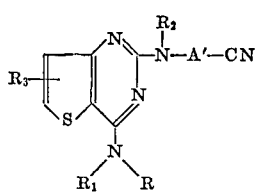
VII wherein the radicals $R_1$, $R_2$, $R_3$ and R are defined as in the beginning and the radical A' has the meaning of the radical A minus a methylene group, however.

The reduction is advantageously carried out with hydrogen activated in the presence of Raney-nickel, palladium or platinum catalysts at elevated temperatures and elevated pressure. In general, temperatures between 30 and 100° C. at a pressure between 20 and 150 atmospheres are sufficient.

METHOD E

Compounds of formula I in which $R_1$ and R together with the nitrogen atom form a morpholino ring optionally substituted by an alkyl group, are produced by intramolecular cyclization of a compound of the formula

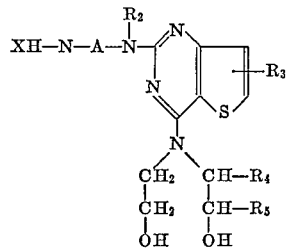
VIII wherein the radicals X, $R_2$, $R_3$ and A are defined as above and $R_4$ and $R_5$ are hydrogen atoms or one of $R_4$ or $R_5$ is an alkyl of 1 to 6 carbon atoms and the other is a hydrogen atom in the presence of an acid condensation agent, and optionally splitting off a protecting group X.

The reaction is carried out in the presence of an acid condensation agent and optionally in a solvent at temperatures between 0 and 175° C. The condensation agent may be acids such as sulfuric acid, phosphoric acid, perchloric acid, hydrochloric acid, hydrobromic acid, toluene sulfonic acid or anhydrous metal salts such as zinc chloride or a cation exchanger. The solvents may be higher hydrocarbons such as tetraline or the acid used as condensation agent such as sulfuric acid or phosphoric acid. The reaction may, however, also be performed in the melt form. Moreover, it may be of advantage to perform the cyclisation under an inert atmosphere. The protecting group X is optionally split off subsequently, for example by means of hydrolysis.

The preparation of the compounds of formula II used as starting materials is described in Germany Offenlegungsschift No. 1,470,356, wherein a 3-amino-thiophene-2-carboxylic acid of the formula

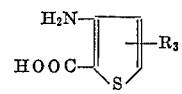
IX or a reactive derivative thereof is reacted with urea or thiourea or cyanic or thiocyanic acid. The reactive derivatives of the 3-aminothiophene-2-carboxylic acid proved to be especially suitable are the esters and amides thereof. This forms compounds of the formula

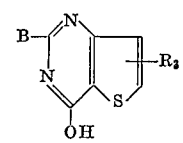
X wherein $R_3$ has the above meaning and B is a free hydroxy or mercapto group. If urea or cyanic acid is reacted with a compound of formula IX, there is formed a compound of formula X, wherein B is a free hydroxy group. If thiourea or thiocyanic acid is used there is obtained a compound of formula X, in which B is the free mercapto group. These reactions are generally performed at elevated temperatures, preferably at temperatures between 20 and 200° C. and optionally in the presence of water, when cyanic or thiocyanic acid is used, or in the presence of an inert, high-boiling solvent such as toluene, xylene or tetrahydronaphthalene.

The compounds of formula II, in which Z is a halogen atom, are produced by converting compounds of formula X, in which B is a free hydroxy group, by conventional methods, for example by heating with a phosphorus halide, first into a compound of the general formula

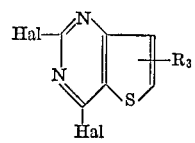
XI in which Hal is a halogen atom. These compounds are then reacted at room temperature or at slightly elevated temperatures in a solvent, for example in ethanol, with compounds of formula V. Thus, the starting compounds of formula II, wherein the radicals $R_1$, R and $R_3$ are defined as above and Z is a halogen atom, are formed.

For the production of compounds of formula II, in which Z is an alkylmercapto or alkylsulfonyl group, compounds of formula X, in which B is a free mercapto group, are converted by conventional methods, by treating with alkylation agents, for example dialkylsulfates or alkylhalides, into the corresponding 2-alkylmercapto-4-hydroxy-thieno[3,2-d]pyrimidines. These compounds are converted by known methods, for example, by heating with a phosphorus halide, into compounds of the formula

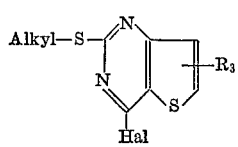

XII wherein Alkyl is any alkyl group and Hal is a halogen atom. These compounds are subsequently reacted at room temperature or at slightly elevated temperatures in a solvent, for example in ethanol, with compounds of formula V. Thus the starting materials of formula II, wherein the radicals $R_1$, R and $R_3$ are defined as above and Z is an alkylmercapto group, are formed. The thus obtained compounds of formula II may subsequently be converted, if desired, by means of oxidation agents, for example chlorine or potassium permanganate, into such compounds of formula II in which Z is an alkylsulfonyl group.

Compounds of general formula III, wherein X is a protecting group, such as for example, acetyl, benzoyl or p-toluenesulfonyl group, are produced according to methods known from the literature (see Houben/Weyl, vol. XI/1, page 26 ff).

The compounds of formula IV are produced, for example, by reaction of a 3-amino-thiophene-2-carboxylic acid of formula IX or a reactive derivative thereof with thiourea or thiocyanic acid. The reactive derivatives of the 3-amino-thiophene-2-carboxylic acid proved to be specially suitable are their esters and amides. Thereby are formed 2-mercapto-4-oxy-thieno [3,2-d] pyrimidines in which the free mercapto group is subsequently alkylated by means of alkyl halides to obtain 2-alkylmercapto-4-oxy-thieno [3,2-d] pyrimidines which are reacted with diamines of formula III,

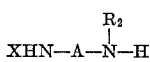

III wherein $R_2$, X and A are defined as above, to the corresponding 2-aminoalkylamino-4-oxy-thieno [3,2-d] pyrimidines, after optionally splitting off the radical X. These pyrimidines are subsequently halogenated by means of phosphoroxyhalides to the starting materials of formula IV, in which Z' is a halogen atom, or they are, for example, converted by means of diphosphorus-pentasulfide into the corresponding starting compounds of formula IV having a mercapto group in 4-position. The thus obtained starting compound of formula IV may subsequently be alkylated, if desired, by means of alkyl halides by conventional methods to form a compound of formula IV, in which Z' is an alkylmercapto group. These compounds can easily be oxidized to compounds of formula IV, in which Z' is an alkylsulfonyl group. The oxidation is preferably carried out by means of chlorine or potassium permanganate.

The starting materials of formula VI are obtained by reaction of 2-hydroxyalkylamino-4-amino-thieno [3,2-d] pyrimidines of the formula

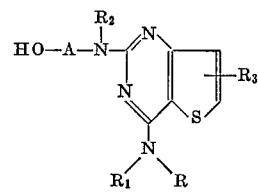

XIII wherein the radicals R to $R_3$ and A are defined as above with halogenation agents such as thionyl chloride. The reaction may be performed in an inert solvent. The compounds of formula XIII are known from the German Offenlegungsschrift No. 1,470,356 or may be produced by the methods described there.

The starting materials of formula VII are obtained by reaction of aminonitriles of the formula

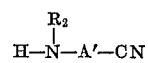

XIV wherein $R_2$ is defined as above and A' has the meaning of A minus a methylene group, with compounds of formula II. The aminonitriles of formula XIV are partially known from the literature or may be produced by methods described in the literature (Houben/Weyl, vol. XI/1, page 272 ff).

The starting materials of formula VIII may be produced from a 2,4-dichloro-thieno [3,2-d] pyrimidine of formula XI by reaction with a diethanolamine and subsequently with an amine of general formula III. If X represents a protecting group, this may subsequently be split off hydrolytically.

The novel compositions of the invention for inhibiting aggregation of platelets are comprised of a compound of formula I or its non-toxic, pharmaceutically acceptable acid addition salts and a major amount of a pharmaceutical carrier. The compositions may be in the form of drinkable or injectable solutions or suspensions, tablets, coated tablets, drops, etc. The usual individual dose is 5 to 100 mg., preferably 10 to 50 mg., of the active ingredient and the daily dose is 100 to 200 mg. per day of the active ingredient.

The method of the invention for inihibiting aggregation of platelets in warm-blooded animals comprises administering to warm-blooded animals an amount of a compound of formula I or its non-toxic, pharmaceutically acceptable acid addition salts sufficient to inhibit aggregation of platelets. The said compounds may be administered transcutaneously or orally. The usual daily dose is 100 to 200 mg./kg.

In the following examples, there are described several preferred embodiments to illustrate the invention. However, it should be understood that the invention is not intended to be limited to the specific embodiments. Examples I to XIV show the preparation of the starting materials and Examples 1 to 13 show the preparation of the final products.

EXAMPLE I 1.6 gm. (0.01 mole) of methyl 3-aminothiophene-2-carboxylate and 3 gm. (0.05 moles) of urea were admixed and then heated for 2 hours at 200° C. to obtain a clear brown melt which solidified when cooled. The said product was dissolved in warm 2N aqueous sodium hydroxide and the solution was decolorized with charcoal and made acidic with 2N hydrochloric acid. The mixture was vacuum filtered to recover the crystalline precipitate which was recrystallized from water to obtain 1.2 gm. (72% yield) of 2,4-dioxythieno[3,2-d]pyrimidine melting at more than 300° C.

*Anaylsis.*—$C_6H_4N_2O_2S$; molecular weight=168.18. Calculated (percent): C, 42.84; H, 2.40; N, 16.66. Found (percent): C, 42.75; H, 2.57; N, 16.82.

Using the same procedure, urea was reacted with methyl 3-amino-5-methyl-thiophene-2-carboxylate and methyl 3-amino-4-methyl-thiophene-2-carboxylate to form 2,4-dioxy-6-methyl-thieno[3,2-d]pyrimidine melting above 320° C., and 2,4-dioxy-7-methyl-thieno[3,2-d]pyrimidine melting above 300° C., respectively.

EXAMPLE II

A mixture of 8.4 gm. (0.05 mol) of 2,4-dioxy-thieno-[3,2-d]pyrimidine and 100 cc. of phosphorus oxychloride was refluxed for 10 hours to obtain a clear solution and excess phosphorus oxychloride was distilled off in vacuo. The residual oil was added to a ice-water mixture and then the mixture was extracted with chloroform. The chloroform extract was washed with water until the wash waters were neutral, dried over sodium sulfate and distilled to dryness. The residue was crystallized from ethanol to obtain 7.6 gm. (74% yield) of 2,4-dichloro-thieno [3,2-d]pyrimidine melting at 141 to 142° C.

*Analysis.*—$C_{11}H_{13}N_3O_3S_2$; molecular weight=299.38. Calculated (percent): C, 35.13; H, 0.98; Cl, 34.58. Found (percent): C, 35.25; H, 1.02; Cl, 34.68.

Using the same procedure, phosphorus oxychloride was reacted with 2,4-dioxy-6-methyl-thieno [3,2-d] pyrimidine and 2,4-dioxy-7-methyl-thieno [3,2-d] pyrimidine to obtain 2,4-dichloro-6-methyl-thieno [3,2-d] pyrimidine melting at 150° C. and 2,4-dichloro-7-methyl-thieno [3,2d] pyrimidine melting at 186° C. respectively.

EXAMPLE III 5.1 gm. of (0.025 mol) of 2,4-dichloro-thieno [3,2-d] pyrimidine was added to 200 cc. of absolute ethanol and 4.8 gm. (0.055 mol) of morpholine were added with stirring to the resulting suspension while keeping the temperature at 20° C. with cooling. The resulting clear solution was allowed to stand for a short while during which a crystalline compound precipitated out and then the reaction mixture was stirred for 2 hours. After vacuum filtration, the crystalline precipitate was washed with water, then ethanol. The product was recrystallized from methyl ethyl ketone to obtain 5.75 gm. (90% yield) of 2-chloro-4-morpholino-thieno [3,2-d] pyrimidine melting at 196–198° C.

*Analysis.*—$C_{10}H_{10}ClN_3OS$; molecular weight=255.74. Calculated (percent): C, 46.97; H, 3.95; N, 16.44. Found (percent): C, 47.10; H, 4.03; N, 16.30.

Using the same procedure, the appropriate 2,4-dichloro-thieno [3,2-d] pyrimidine was reacted with the appropriate amino compound to obtain the products in Table I.

TABLE I

| Product | Melting point (° C.) | Crystallization from— |
|---|---|---|
| 2-chloro-6-methyl-4-morpholino-thieno [3,2-d]pyrimidine. | 180–181 | Acetone. |
| 2-chloro-4-(2-methyl-morpholino)-thieno [3,2-d]pyrimidine. | 169–171 | Ethanol. |
| 2-chloro-4-(4-hydroxypiperidino)-thieno [3,2-d]pyrimidone. | 176–178 | Butanol. |
| 2-chloro-4-(4-methyl piperazino)-thieno [3,2-d]pyrimidine. | 118–120 | Ethanol. |
| 2-chloro-4-pyrrolidino-thieno [3,2-d] pyridine. | 179–180 | Do. |
| 2-chloro-4-hexamethyleneimino-thieno [3,2-d]pyrimidine. | 89–90 | Do. |
| 2-chloro-4-amino-thieno[3,2-d]pyrimidine. | 273–275 | Do. |
| 2-chloro-4-(n-pentylamino)-thieno[3,2-d] pyrimidine·HCl. | 206–208 | Absolute ethanol petroleum ether. |
| 2-chloro-4-diethylamino-thieno[3,2-d] pyrimidine. | 104–105 | |
| 2-chloro-4-piperidino-thieno[3,2-d]-pyrimidine. | 127–128 | Ethanol. |
| 2-chloro-4-dimethylamino-thieno [e,2-d]-pyrimidine. | 163 | Acetone. |
| 2-chloro-4-methylamino-thieno[3,2-d] pyrimidine. | 253 | Acetone-ethanol (1–1). |
| 2-chloro-4-n-propylamino-thieno[3,2-d] pyrimidine. | 96 | Petroleum ether-ethyl acetate (10–1). |
| 2-chloro-7-methyl-4-morpholino-thieno [3,2-d]pyrimidine. | 128 | Ethanol. |

EXAMPLE IV

A solution of 19.4 gm. (0.2 mol) of potassium thiocyanate in 20 cc. of water were added dropwise with stirring over 30 minutes to a solution of 15.7 gm. (0.1 mol) of methyl 3-amino-thiophene-2-carboxylate in 150 cc. of hydrochloric acid warmed to 70° C. and white crystals immediately began precipitating. The reaction mixture was heated for 2½ hours at 95° C. and the reaction mixture was vacuum filtered. The crystalline precipitate was dissolved in 250 cc. of 2N aqueous sodium hydroxide with heating. The cooled solution was acidified with glacial acetic acid whereby an analytically pure compound precipitated out. After vacuum filtration, the crystals were washed with water and dried to obtain 14.9 gm. (81% yield) of 2-mercapto-4-oxy-thieno [3,2-d]pyrimidine melting above 300° C.

*Analysis.*—$C_6H_4N_2OS_2$; molecular weight=184.25. Calculated (percent): C, 39.12; H, 2.19. Found (percent): C, 39.20; H, 2.21.

EXAMPLE V

A solution of 10.0 gm. (0.055 mol) of 2-mercapto-4-oxy-thieno[3,2-d]pyrimidine in 50 cc. of aqueous sodium hydroxide solution was slowly added with stirring at 50° C. to 30.0 gm. of (0.275 mol) of ethyl bromide and then the reaction mixture was refluxed for 2 hours. After cooling, the clear solution was made acidic with glacial acetic acid and the mixture was vacuum filtered. The crystalline precipitate was washed with water and crystallized from ethanol to obtain 9.0 gm. (77% yield) of 2-ethyl mercapto-4-oxy-thieno[3,2-d]pyrimidine melting at 201–203° C.

*Analysis.*—$C_9H_8N_2OS_2$; molecular weight=212.30. Calculated (percent): C, 45.26; H, 3.80; S, 30.21. Found (percent): C, 45.40; H, 3.85; S, 30.13.

EXAMPLE VI

A mixture of 2.1 gm. (0.011 mol) of 2-ethyl mercapto-4-oxy-thieno[3,2-d]pyrimidine and 60.0 gm. (1.0 mol) of 1,2-diamino ethane was heated for 10 hours at 160° C. in a sealed tube. After cooling the reaction mixture, the excess amine was distilled off in vacuo. The residue was subjected to chromatography over a column of 0.2–0.5 mm. silica gel with elution with a 7–3 mixture of chloroform-methanol. The pure fractions were evaporated to dryness and the residue was crystallized from a petroleum ether-ethanol mixture to obtain 0.59 gm. (28% yield) of 2 - (2-aminoethylamino) - 4-oxy-thieno [3,2-d]pyrimidine melting at 221° C. with decomposition.

*Analysis.*—$C_8H_{10}N_4OS$; molecular weight=210.27. Calculated (percent): C, 45.69; H, 4.79; N, 26.64. Found (percent): C, 45.54; H, 4.86; N, 26.83.

EXAMPLE VII

A mixture of 2.1 gm. (0.01 mol) of 2-(2-amino ethylamino) - 4 - oxy-thieno[3,2-d]pyrimidine and 30 cc. of phosphorus oxychloride was refluxed for 2 hours and excess phosphorus oxychloride was distilled off in vacuo from the resulting clear solution. The residue was dissolved in water and the aqueous solution was made alkaline with aqueous sodium hydroxide solution with ice cooling. The aqueous phase was extracted with methylene chloride and the organic extracts were washed with water until the wash waters were neutral and then dried over sodium sulfate and distilled to dryness. The solid residue was crystallized from ethanol to obtain 0.48 gm. (21% yield) of 2-(2-amino ethylamino)-4-chloro-thieno [3,2-d]pyrimidine melting above 300° C.

*Analysis.*—$C_8H_9ClN_4S$; molecular weight=228.72. Calculated (percent): C, 42.01; H, 3.97; Cl, 15.50. Found (percent): C, 42.30; H, 4.06; Cl, 15.75.

EXAMPLE VIII

A mixture of 5.1 gm. (0.02 mol) of 2-chloro-4-morpholino-thieno[3,2-d]pyrimidine and 15 cc. of 5 - amino - 1-pentanol were heated at 120° C. for 4 hours and after cooling, the clear solution was poured into water. An oil separated which crystallized upon standing and then the reaction mixture was vacuum filtered. The crystals were washed with water and crystallized from 70% methanol to obtain 3.6 gm. (57% yield) of 2-(5-hydroxypentylamino) - 4 - morpholino - thieno[3,2-d]pyrimidine melting at 118–119° C.

*Analysis.*—$C_{15}H_{22}N_4O_2S$; molecular weight=322.44. Calculated (percent): C, 55.87; H, 6.88; N, 17.38. Found (percent): C, 55.79; H, 6.81; N, 17.50.

Using the same method, the appropriate thieno[3,2-d]pyrimidine and amino alcohol were reacted to obtain the compounds of Table II.

TABLE II

| Products | Melting point (° C.) | Crystallized from— |
| --- | --- | --- |
| 2-(2-hydroxyethylamino)-4-morpholino-thieno[3,2-d]pyrimidine. | 122–123 | Acetone. |
| 2-[(2-hydroxyethyl)methylamino]-4-morpholino-thieno[3,2-d]pyrimidine. | 90–92 | Ether-methanol. |
| 2-(3-hydroxypropylamino)-4-morpholino-thieno[3,2-d]pyrimidine·HCl. | 238–239 | Ethanol-ethyl-acetate. |
| 2-(4-hydroxybutylamino)-4-morpholino-thieno[3,2-d]pyrimidine·HCl. | 212 | Ethanol. |
| 2-(2-hydroxypropylamino)-4-morpholino-thieno[3,2-d]pyrimidine·HCl. | 243–244 | Do. |
| 2-[(5-hydroxypentyl)methylamino]-4-morpholino-thieno[3,2-d]pyrimidine·HCl. | 208–209 | Do. |
| 2-[(3-hydropropyl)methylamino]-4-morpholino-thieno[3,2-d]pyrimidine·HCl. | 203 | Ethanol-acetone (2–1). |
| 2-[(3-hydroxypropyl)ethylamino]-4-morpholino-thieno[3,2-d]pyrimidine·HCl. | 235 | Do. |
| 2-[(4-hydroxybutyl)methylamino]-4-morpholino-thieno[3,2-d]pyrimidine·HCl. | 217 | Do. |
| 2-[(4-hydroxybutyl)ethylamino]-4-morpholino-thieno[3,2-d]pyrimidine·HCl. | 226–227 | Do. |
| 2-[(4-hydroxybutyl)-n-propylamino]-4-morpholino-thieno[3,2-d]pyrimidine·HCl. | 160–163 | Do. |
| 2-[(4-hydroxybutyl)-n-butylamino]-4-morpholino-thieno[3,2-d]pyrimidine·HCl. | 162–165 | Do. |
| 2-[(5-hydroxypentyl)ethylamino]-4-morpholino-thieno[3,2-d]pyrimidine·HCl. | 115–120 | Ethanol. |
| 2-[(6-hydroxyhexyl)methylamino]-4-morpholino-thieno[3,2-d]pyrimidine·HCl. | 115 | Do. |
| 2-[(6-hydroxyhexyl)ethylamino]-4-morpholino-thieno[3,2-d]pyrimidine. | (¹) | Eluent: petroleum ether-ethyl acetate (1–1). |
| 2-[(5-hydroxypentyl)butylamino]-4-morpholino-thieno[3,2-d]pyrimidine·HCl. | 90 | Isopropanol petroleum ether. |

¹ $R_f$ value=0.5.

EXAMPLE IX 18 gm. (0.05 mol) of 2 - (5 - hydroxypentylamino)-4-morpholino-thieno[3,2-d] pyrimidine was added to 30 cc. of thionylchloride and the mixture was allowed to stand overnight. Excess thionylchloride was distilled off in vacuo and the residue was added to a mixture of acetone or ether. The mixture was vacuum filtered and the crystalline precipitate was dried to obtain 12.5 gm. (66.3% yield) of 2-(5-chloropentylamino) - 4 - morpholino - thieno[3,2-d]pyrimidine·HCl melting at 151–152° C.

*Analysis.*—$C_{15}H_{22}Cl_2N_4O$; molecular weight=377.29. Calculated (percent): C, 47.80; H, 5.88; N, 14.87. Found (percent): C, 48.00; H, 6.01; N, 14.75.

Using the same procedure, thionyl chloride was reacted with the appropriate thieno[3,2-d]pyrimidine to obtain the products of Table III.

TABLE III

| Product | Melting point (° C.) | Solvent crystallized from— |
| --- | --- | --- |
| 2-[(5-chloropentyl)methylamino]-4-morpholino-thieno[3,2-d]pyrimidine·HCl. | 173–175 | Ethanol-acetone (1–1). |
| 2-[(3-chloropropyl)methylamino]-4-morpholino-thieno[3,2-d]pyrimidine·HCl. | 180 | Do. |
| 2-[(4-chlorobutyl)methylamino]-4-morpholino-thieno[3,2-d]pyrimidine·HCl. | 205–208 | Do. |
| 2-[(4-chlorobutyl)ethylamino]-4-morpholino-thieno[3,2-d]pyrimidine·HCl. | 165 | Do. |
| 2-[(4-chlorobutyl)-n-propylamino]-4-morpholino-thieno[3,2-d]pyrimidine·HCl. | 195 | Do. |
| 2-[(4-chlorobutyl)-n-butylamino]-4-morpholino-thieno[3,2-d]pyrimidine·HCl. | 187–188 | Do. |
| 2-[(5-chloropentyl)ethylamino]-4-morpholino-thieno[3,2-d]pyrimidine·HCl. | 183–185 | Do. |
| 2-[(5-chloropentyl)-n-butylamino]-4-morpholino-thieno[3,2-d]pyrimidine. | (¹) | Eluent: petroleum ether-ethyl acetate (1–1). |
| 2-[(6-chlorohexyl)methylamino]-4-morpholino-thieno[3,2-d]pyrimidine. | (¹) | Do. |
| 2-[(6-chlorohexyl)ethylamino]-4-morpholino-thieno[3,2-d]pyrimidine. | (¹) | Do. |

¹ Oil, $R_f$ value=0.8.

EXAMPLE X 2.16 gm. (0.01 mol) of 2 - methyl mercapto - 4 - chloro-thieno[3,2-d] pyrimidine (produced from phosphorous oxychloride and 2 - methylmercapto - 4 - oxy-thieno-[3,2-d]pyrimidine melting at 71–73° C.) were added to 30 cc. of absolute ethanol and then 1.74 gm. (0.02 mol) of morpholine were added with stirring to the reaction mixture while cooling to 20° C. The reaction mixture was then stirred for 3 hours at room temperature and was then vacuum filtered. The precipitate was washed with water and then ethanol and crystallized from ethanol to obtain 2.05 gm. (77% yield) of 2-methyl mercapto-4-morpholino-thieno[3,2-d]pyrimidine melting at 138–140° C.

*Analysis.*—$C_{11}H_{13}N_3OS_2$; molecular weight=267.38. Calculated (percent): C, 49.44; CH, 4.90; N, 15.72. Found (percent): C, 49.21; CH, 4.95; N, 15.84.

EXAMPLE XI

A solution of 3.5 gm. (0.022 mol) of potassium permanganate in 25 cc. of water was added dropwise over 15 minutes to a solution of 2.67 gm. (0.01 mol) of 2-methyl mercapto-4-morpholino-thieno[3,2 - d]pyrimidine in 25 cc. of glacial acetic acid and the reaction mixture was then stirred for 2¾ hours at 25° C. The solution was decolored with a sodium bisulfite solution and was then made alkaline by the addition of aqueous sodium hydroxide solution. The aqueous phase was extracted several times with methylene chloride and the combined methylene chloride phases were washed with water, dried over sodium sulfate and evaporated to dryness in vacuo. The residue was crystallized from ethanol to obtain 1.84 gm. (62% yield) of 2-methylsulfonyl-4-morpholino-thieno[3,2-d]pyrimidine melting at 191–193° C.

*Analysis.*—$C_{11}H_{13}N_3O_3S_2$; molecular weight=299.38. Calculated (percent): C, 44.12; H, 4.38; N, 14.03. Found (percent): C, 44.19; H, 4.45; N, 13.90.

EXAMPLE XII

A mixture of 2.1 gm. (0.01 mol) of 2-(2-aminoethylamino)-4-oxy-thieno[3,2-d]pyrimidine and 2.5 gm. (0.011 mol) of phosphorus pentasulfide in 25 cc. of absolute pyridine was refluxed for 4 hours and the resulting clear solution was evaporated to dryness in vacuo. The residue was added to 20 cc. of water and the mixture was refluxed for 1 hour and then was cooled to 5° C. The pH of the solution was adjusted to 12 by the addition of 2N aqueous sodium hydroxide and was then filtered through charcoal. Glacial acetic acid was added to the solution which caused the formation of a precipitate which was recovered by vacuum filtration. The solid product was washed with water and crystallized from dimethyl formamide to obtain 0.9 gm. (40% yield) of 2-(2-aminoethylamino)-4-mercapto-thieno[3,2-d]pyrimidine melting at 249–250° C. (decomp.).

*Analysis.*—$C_8H_{10}N_4S_2$; molecular weight=226.23. Calculated (percent): C, 42.46; H, 4.45; N, 24.76. Found (percent): C, 42.33; H, 4.47; N, 24.57.

EXAMPLE XIII 2.26 gm. (0.01 mol) of 2-(2-aminoethylamino)-4-mercapto-thieno[3,2-d]pyrimidine were dissolved in 40 cc. of 0.25N potassium hydroxide solution and after cooling to 0° C., 1.42 gm. (0.01 mol) of methyl iodide were added thereto with stirring. An oil soon separated and stirring was continued for 2 hours at 0° C. The mixture was extracted several times with chloroform and the combined extracts were washed with water, dried over sodium sulfate and evaporated to dryness. The residue was crystallized from ether to obtain 1.9 gm. (79% yield) of 2-(2-aminoethylamino)-4-methyl mercapto-thieno[3,2-d]pyrimidine melting at 75° C. (decomp.).

*Analysis.*—$C_9H_{12}N_4S_2$; molecular weight=240.36. Calculated (percent): C, 44.96; H, 5.03; N, 23.31. Found (percent): C, 45.13; H, 5.10; N, 23.18.

EXAMPLE XIV

A mixture of 5.2 gm. (0.02 mol) of 2-chloro-4-morpholino-thieno[3,2-d]pyrimidine and 20 cc. of 3-n-butylamino-propionitrile was heated at 150° C. for 10 hours and then excess 3-n-butylamino-propionitrile was distilled off in vacuo. The residue was poured into water and the mixture was extracted several times with methylene chloride. The methylene chloride extracts were dried over sodium sulfate and evaporated to dryness. The residue was purified by chromatography over a silica gel column with elution with a 2–1 mixture of petroleum ether and ethylacetate. The elution agent was distilled off and the resulting yellow oil was dissolved in methanolic hydrochloride and the addition of acetone caused the precipitation of 5.0 gm. (65.4% yield) of 2-[(2-cyanoethyl)-n-butylamino]-4-morpholino-thieno[3,2-d]pyrimidine hydrochloride which melted at 182–185° C. after crystallization from isopropanol.

*Analysis.*—$C_{17}H_{24}N_5ClOS$; molecular weight=381.96. Calculated (percent): C, 53.45; H, 6.33; N, 18.33; Cl, 9.27; S, 8.38. Found (percent): C, 53.50; H, 6.59; N, 18.45; Cl, 9.02; S, 8.33.

Using the same procedure, 2-chloro-4-morpholino-thieno[3,2-d]pyrimidine was reacted with 3-ethylamino-propionitrile and 3-methylamino-propionitrile to form 2-[(2-cyanoethyl)ethylamino]-4-morpholino - thieno[3,2-d] pyrimidine hydrochloride melting at 180° C. and 2-[(2-cyanoethyl)methylamino] - 4- morpholino-thieno[3,2-d] pyrimidine hydrochloride melting at 100–101° C., respectively.

EXAMPLE I

A mixture of 5.2 gm. (0.02 mol) of 2-chloro-4-morpholino-thieno[3,2-d]pyrimidine and 20 cc. of 1,2-diaminoethane was heated for 30 minutes at 120° C. and after cooling, the reaction mixture was poured into a water-ice mixture. The aqueous solution was made strongly alkaline by the addition of a 30% aqueous sodium hydroxide solution and was then extracted several times with methylene chloride. The combined organic extracts were washed with water, dried over sodium sulfate and evaporated to dryness. The non-crystalline residue was purified by chromatography over a silica gel column with elution with acetone-methanol (7–3) mixture and the pure fractions were evaporated to dryness. The non-crystalline residue was dissolved in absolute ether and precipitation was effected by addition of ethereal hydrochloric acid. The precipitate was recovered by vacuum filtration, was washed with ether and was crystallized from absolute ethanol to obtain 4.5 gm. (64% yield of 2 - (2-aminoethylamino) - 4 - morpholino-thieno[3,2-d] pyrimidine dihydrochloride melting at 282–283° C. (decomp.).

*Analysis.* — $C_{12}H_{17}N_5OS \cdot 2HCl$ molecular weight= 352.30. Calculated (percent): C, 40.91; H, 5.44; N, 19.88; Cl, 20.13. Found (percent): C, 40.90; H, 5.49; N, 19.79; Cl, 20.05.

Using the same process, the appropriate thieno[3,2-d] pyrimidine and diamino alkane were reacted to form the products of Table IV.

TABLE IV

| Product | Melting point (° C.) | Solvent of crystallization |
|---|---|---|
| 2-(2-aminoethylamino)-6-methyl-4-morpholino-thieno[3,2-d]pyrimidine 2HCl. | [1] 309–311 | Methanol. |
| 2-[(2-aminoethyl)methylamino]-4-morpholino-thieno[3,2-d]pyrimidine-2HCl. | [1] 275 | Ethanol. |
| 2-(2-aminopropylamino)-4-morpholino-thieno[3,2-d]pyrimidine-2HCl. | [1] 214–216 | Do. |
| 2-(2-amino-1-methyl propylamino)-4-morpholino-thieno[3,2-d]pyrimidine-2HCl. | [1] 185 | Isopropanol. |
| 2-(3-aminopropylamino)-4-morpholino-thieno[3,2-d]pyrimidine-2HCl. | [1] 255–258 | Ethanol. |
| 2-(4-aminobutylamino)-4-morpholino-thieno[3,2-d]pyrimidine-2HCl. | [1] 245–247 | Methanol-methylethyl ketone (1–2). |
| 2-(6-aminohexylamino)-4-morpholino-thieno[3,2-d]pyrimidine-2HCl. | [1] 280–282 | Ethanol-acetone (1–1). |
| 2-(10-aminodecylamino)-4-morpholino-thieno[3,2-d]pyrimidine-2HCl. | [1] 184–186 | Isopropanol-acetone (1–2). |
| 2-(3-aminopropylamino)-4-amino-thieno[3,2-d]pyrimidine. | 129–130 | Ethanol. |
| 2-(2-aminoethylamino)-4-pentylamino-thieno[3,2-d]pyrimidine-2HCl. | [1] 273–275 | Do. |
| 2-(4-aminobutylamino)-4-n-propylamino-thieno[3,2-d]pyrimidine-2HCl. | 216–217 | Ethanol-acetone (1–3). |
| 2-(2-aminoethylamino)-4-(2-methyl-morpholino)-thieno[3,2-d]pyrimidine-2HCl. | [1] 276–278 | Ethanol. |
| 2-(2-aminoethylamino)-4-(4-methyl-piperazino)-thieno[3,2-d]pyrimidine-3HCl. | [1] 183–186 | Methanol. |
| 2-(2-aminoethylamino)-4-(4-hydroxy-piperidino-thieno[3,2-d]pyrimidine-2HCl. | [1] 247–249 | Ethanol. |
| 2-(4-aminobutylamino)-4-hexamethylene-imino-thieno[3,2-d]pyrimidine-2HCl. | [1] 123–125 | Ethanol-acetone (1–2). |
| 2-(2-aminoethylamino)-4-piperidino-thieno[3,2-d]pyrimidine-2HCl. | 275–277 | Ethanol-acetone (1–5). |
| 2-(4-aminobutylamino)-4-piperidino-thieno[3,2-d]pyrimidine-2HCl. | 219 | Do. |
| 2-(6-aminohexylamino)-4-piperidino-thieno[3,2-d]pyrimidine-2HCl. | 281–283 | Do. |
| 2-(3-aminopropylamino)-4-dimethyl-amino-thieno[3,2-d]pyrimidine-2HCl. | 269–271 | Methanol. |
| 2-(4-aminobutylamino)-4-dimethyl-amino-thieno[3,2-d]pyrimidine-2HCl. | 280 | Ethanol. |
| 2-(6-aminohexylamino)-4-dimethyl-amino-thieno[3,2-d]pyrimidine-2HCl. | 265–266 | Ethanol-acetone. |
| 2-(4-aminobutylamino)-6-methyl-4-morpholino-thieno[3,2-d]pyrimidine-2HCl. | 315–316 | Ethanol. |
| 2-(5-aminopentylamino)-6-methyl-4-morpholino-thieno[3,2-d]pyrimidine-2HCl. | 302–305 | Do. |
| 2-(2-aminoethylamino)-7-methyl-4-morpholino-thieno[3,2-d]pyrimidine-2HCl. | [1] 290 | Methanol. |
| 2-(5-aminopentylamino)-7-methyl-4-morpholino-thieno[3,2-d]pyrimidine-2HCl. | 250 | Ethanol. |
| 2-(2-aminoethylamino)-4-methylamino-thieno[3,2-d]pyrimidine-2HCl. | [1] 280 | Ethanol-acetone (1–3). |
| 2-(4-aminobutylamino)-4-methylamino-thieno[3,2-d]pyrimidine-2HCl. | [1] 300 | Ethanol-acetone. |
| 2-(6-aminohexylamino)-4-methylamino-thieno[3,2-d]pyrimidine-2HCl. | 241 | Do. |
| 2-(2-aminoethylamino)-4-n-propyl-amino-thieno[3,2-d]pyrimidine-2HCl. | 246–247 | Ethanol-acetone (1–3). |
| 2-(2-aminoethylamino)-4-diethylamino-thieno[3,2-d]pyrimidine-2HCl. | [1] 165–166 | Methanol-acetone (1–1). |

[1] Decomposes.

EXAMPLE II

A mixture of 2.3 gm. (0.01 mol) of 2-(2-aminoethylamino)-4-chloro-thieno[3,2,-d]pyrimidine and 15 cc. of pyrrolidine was refluxed for 1 hour and the excess amine was distilled off in vacuo. The residue was taken up in a 1N aqueous sodium hydroxide solution and the solution was extracted several times with methylene chloride. The combined extracts were washed with water, dried over sodium sulfate and evaporated to dryness. The non-crystalline residue was dissolved in absolute ether and the addition of etheral hydrochloric acid caused a precipitate to form which was recovered by vacuum filtration. The solid

13 was washed with ether and then was crystallized from absolute methanol to obtain 1.2 gm. (36% yield) of 2-(2 - aminoethylamino) - 4 - pyrrolidino - thieno[3,2 - d]pyrimidine dihydrochloride melting at 292–294° C.

*Analysis.* — $C_{12}H_{17}N_5S \cdot 2HCl$; molecular weight = 336.30. Calculated (percent): C, 42.85; H, 5.69; N, 20.83. Found (percent): C, 42.97; H, 5.76; N, 20.85.

EXAMPLE III

Step A

A mixture of 16 gm. (0.0424 mol) of 2-(5-chloropentylamino)-4-morpholino-thieno[3,2 - d]pyrimidine hydrochloride and a solution of 17.5 gm. (0.094 mol) of potassium phthalimide in 100 cc. of dimethylformamide were heated at 145° C. for 14 hours and after cooling, the reaction mixture was added to water. The mixture was extracted with chloroform and the chloroform phase was dried over sodium sulfate and evaporated to dryness. The residue was triturated with a mixture of ethyl acetate-petroleum ether and vacuum filtered to obtain 10 (52.3% yield) of 2-(5-phthalimido-pentylamino) - 4 - morpholino-thieno[3,2-d]pyrimidine melting at 122–124° C. after crystallization from a 1–1 mixture of ethyl acetate petroleum ether.

Step B

A solution of 2.15 gm. (0.033 mol) of hydroxylamine hydrochloride in 30 cc. of ethanol was added to 15 cc. of 4N methanolic sodium methylate solution and the mixture was filtered to remove precipitated sodium chloride. A solution of 3.82 gm. (0.00845 mol) of the phthalimido derivative produced in Step A in 20 cc. of ethanol was added to the filtrate and the reaction mixture was stirred for 2 hours at room temperature. The mixture was vacuum filtered to remove the gelatinous precipitate of the sodium salt of N-hydroxyphthalimide and the filtrate was added to methanolic hydrochloric acid and then was evaporated to dryness. The crystalline residue was crystallized from acetone-methanol mixture to obtain 1.94 gm (58.1% yield) of 2-(5-aminopentylamino)-4-morpholino-thieno[3,2-d]pyrimidine dehydrochloride melting at 254–256° C.

*Analysis.*—$C_{15}H_{25}Cl_2N_5OS$; molecular weight=394.29. Calculated (percent): C, 45.70; H, 6.40; N, 17.79; S, 8.12. Found (percent): C, 45.50; H, 6.56; N, 17.60; S, 8.24.

Using the same process, the appropriate 4-morpholino-thieno[3,2-d]pyrimidine was reacted first with potassium phthalimide and then with hydroxylamine to obtain the products in Table V.

TABLE V

| Product | Melting point (° C.) | Solvent for crystallization |
| --- | --- | --- |
| 2-[(5-aminopentyl)methylamino]-4-morpholino-thieno[3,2-d]pyrimidine]-2HCl. | 255–257 | Ethanol-acetone (1–2). |
| 2-[(4-aminobutyl)methylamino]-4-morpholino-thieno[3,2-d]pyrimidine-2HCl. | 260 | Ethanol-acetone. |
| 2-[(4-aminobutyl)ethylamino]-4-morpholino-thieno[3,2-d]pyrimidine-2HCl. | 259–261 | Do. |
| 2-[(4-aminobutyl)n-propylamino]-4-morpholino-thieno[3,2-d]pyrimidine-2HCl. | 185 | Do. |
| 2-[(4-aminobutyl)-n-butylamino]-4-morpholino-thieno[3,2-d]pyrimidine-2HCl. | 280 | Do. |
| 2-[(5-aminopentyl)-ethylamino]-4-morpholino-thieno[3,2-d]pyrimidine-2HCl. | 236–238 | Ethylacetate-methanol (3–1). |
| 2-[(6-aminohexyl)methylamino]-4-morpholino-thieno[3,2-d]pyrimidine-2HCl. | 227–228 | Ethanol. |
| 2-[(6-aminohexyl)ethylamino]-4-morpholino-thieno[3,2-d]pyrimidine]-2HCl. | | (¹) Eluent: methanol-ammonia (9–1). |

¹ Yellow oil, $R_f$ value=0.5.

14

EXAMPLE 4

A mixture of 3.77 gm. (0.01 mol) of 2-(5-chloropentylamino)-4-morpholino-thieno[3,2-d]pyrimidine hydrochloride and 50 cc. of liquid ammonia were heated at 100° C. in a sealed tube for 16 hours and after cooling, excess ammonia was distilled off and the residue was purified by chromatography over silica gel with elution with a 6–1 mixture of methanol-ammonia. The residue was taken up in a small amount of methanol and methanolic hydrochloric acid was added thereto followed by addition of acetone which resulted in the precipitation of 2-(5-aminopentylamino) - 4-morpholino-thieno[3,2-d]pyrimidine dihydrochloride which after crystallization from a acetone-methanol mixture melted at 254–256° C.

Using the same process, ammonia and 2-[(5-chloropentyl)methylamino] - 4-morpholino-thieno[3,2-d]pyrimidine hydrochloride was reacted to form 2 - [(5-aminopentyl)methylamino] - 4-morpholino-thieno[3,2-d]pyrimidine dihydrochloride which after crystallization from a 1–2 mixture of ethanol-acetone melted at 255–257° C.

EXAMPLE 5

A mixture of 2.67 gm. (0.01 mol) of 2-methylmercapto - 4-morpholino-thieno[3,2-d]pyrimidine, 65 cc. of 1,2-diaminoethane and 65 cc. of glacial acetic acid was refluxed for 24 hours and then the reaction mixture was poured into water and made alkaline with 30% aqueous sodium hydroxide. The aqueous phase was extracted with methylene chloride several times and the combined extracts were washed with water and evaporated to dryness. The residue, which was a mixture of 2-(2-aminoethylamino)-4-morpholino-thieno[3,2-d]pyrimidine and 2-(2-acetamidoethylamino)-4-morpholino-thieno[3,2-d]pyrimidine, was added to 30 cc. of concentrated hydrochloric acid and the mixture was refluxed for 8 hours and then cooled. The solution was made alkaline with 30% aqueous sodium hydroxide and was extracted with methylene chloride. The organic extracts were dried over sodium sulfate and evaporated to dryness. The residue was dissolved in ether and etheral hydrochloric acid was added thereto. The resulting precipitate was recovered by vacuum filtration and was crystallized from ethanol to obtain 1.6 gm. (45% yield) of 2 - (2-aminoethylamino)-4-morpholino-thieno[3,2-d]pyrimidine dihydrochloride melting at 282–283° C. (decomp.).

EXAMPLE 6

A mixture of 2.99 gm. (0.01 mol) of 2-methylsulfonyl-4-morpholino-thieno[3,2-d]pyrimidine and 25 cc. of 1,2-diaminoethane was heated at 80° C. for 30 minutes and the reaction solution was concentrated to ½ its volume in vacuo and was poured into a water-ice mixture. The aqueous solution was made strongly alkaline by the addition of 30% aqueous sodium hydroxide and was then extracted several times with methylene chloride. The organic phase was washed with water, dried over sodium sulfate and evaporated to dryness. The residue was purified by chromatography and was then dissolved in absolute ether. Precipitation was effected by the addition of ethereal hydrochloric acid and the product was crystallized from absolute ethanol to obtain 2.9 gm. (82% yield) of 2 - (2-aminoethylamino)-4-morpholino-thieno[3,2-d] pyrimidine dihydrochloride melting at 282–283° C. (decomp.).

EXAMPLE 7

A mixture of 2.4 gm. (0.01 mol) of 2-(2-aminoethylamino) - 4-methylmercapto-thieno[3,2-d]pyrimidine, 50 cc. of morpholine and 50 cc. of glacial acetic acid was refluxed for 10 hours and was then poured into water. The aqueous solution was made alkaline with 30% aqueous sodium hydroxide solution and extracted several times with methylene chloride. The combined extracts were washed with water and evaporated to dryness. The residue, a mixture of 2 - (2 - aminoethylamino)-4-morpholino-thieno[3,2-d]pyrimidine and 2-(2-acetamidoethylamino)-

4 - morpholino-thieno[3,2-d]pyrimidine, was added to 30 cc. of concentrated hydrochloric acid and the mixture was refluxed for 8 hours and then cooled. The mixture was made alkaline with 30% aqueous sodium hydroxide solution and was then extracted with methylene chloride. The methylene chloride extracts were dried over sodium sulfate and evaporated to dryness. The residue was dissolved in ether and addition of etheral hydrochloric acid caused a precipitate to form. The precipitate has crystallized from ethanol to obtain 1.9 gm. (54% yield) of 2 - (2 - aminoethylamino) - 4-morpholino-thieno[3,2-d]pyrimidine dihydrochloride melting at 282–283° C. (decomp.).

EXAMPLE 8

A mixture of 20 cc. of morpholine and 3.14 gm. (0.01 mol) of 2 - (2-acetylaminoethylamino)-4-methylsulfonyl-thieno[3,2-d]pyrimidine (made by oxidation of 2-(2-acetamidoethylamino) - 4-methylmercapto-thieno[3,2-d]pyrimidine with potassium permanganate) melting 229–231° C. was heated at 75° C. for 30 minutes and the solution was evaporated to dryness in vacuo. The residue was added to 30 cc. of concentrated hydrochloric acid and the mixture was refluxed for 8 hours and then was cooled. The mixture was made alkaline with 30% aqueous sodium hydroxide solution and was extracted with methylene chloride. The methylene chloride was washed with water, dried over sodium sulfate and evaporated to dryness. The residue was dissolved in ether and the addition of etheral hydrochloric acid thereto caused a precipitate to form. Crystallization from ethanol gave 2.3 gm. (65% yield) of 2 - (2-aminoethylamino)-4-morpholino-thieno[3,2-d]pyrimidine dihydrochloride melting at 282–283° C. (decomp.).

EXAMPLE 9

A mixture of 2.26 gm. (0.01 mol) of 2-(2-aminoethylamino) - 4-mercapto-thieno[3,2-d]pyrimidine and 40 cc. of morpholine was refluxed for 50 hours and excess amine was then distilled off in vacuo. The residue was purified by chromatography over silica gel and the free base was treated with etheral hydrochloric acid followed by crystallization from ethanol to form 0.4 gm. (11% yield) of 2-(2 - aminoethylamino)-4-morpholino-thieno[3,2-d]pyrimidine dihydrochloride melting at 282–283° C. (decomp.).

EXAMPLE 10

A mixture of 2.56 gm. (0.01 mol) of 2-chloro-4-morpholino-thieno[3,2-d]pyrimidine and 4.08 gm. (0.04 mol) of 1-acetylamino-2-aminoethane was heated at 120° C. for 2 hours and then cooled. The solution was poured into an ice water mixture and was extracted several times with water. The organic phase was washed with water, dried over sodium sulfate and evaporated to dryness. The residue was crystallized from isopropanol to obtain 2.5 gm. (78% yield) of 2-(2-acetylaminoethylamino)-4-morpholino-thieno[3,2-d]pyrimidine melting at 174–176° C.

A mixture of 1.6 gm. (0.005 mol) of 2-(2-acetylaminoethylamino)-4 - morpholino-thieno[3,2-d]pyrimidine and 15 cc. of concentrated hydrochloric acid was refluxed for 8 hours and then was cooled. The reaction mixture was poured onto ice and made strongly alkaline with a 30% aqueous sodium hydroxide solution. The mixture was then extracted with methylene chloride and the combined extracts were dried over sodium sulfate and evaporated to dryness. The non-crystalline residue was dissolved in absolute ether and the addition of ethereal hydrochloric acid caused formation of a precipitate which was crystallized from absolute ethanol to obtain 0.7 gm. (40% yield) of 2-(2 - aminoethylamino) - 4 - morpholino-thieno[3,2-d]pyrimidine dihydrochloride melting at 282–283° C. (decomp.).

EXAMPLE 11

10.7 gm. (0.035 mol) of 2-[(2-cyanoethyl)methylamino]-4-morpholino-thieno[3,2-d]pyrimidine were dissolved in 200 cc. of methanolic ammonia and the mixture was hydrogenated for 8 hours at room temperature with a hydrogen pressure of 100 atmospheres in an autoclave with 10 gm. of Raney nickel. The catalyst was filtered off and the filtrate was evaporated to dryness. The residue was added to water and the pH of the resulting solution was adjusted to 6 by the addition of dilute hydrochloric acid. The reaction mixture was extracted with chloroform, the aqueous phase was made alkaline and was extracted again with chloroform. The chloroform phase was dried over sodium sulfate and evaporated to dryness. The residue was dissolved in isopropanol and the addition resulted in the precipitation of 5.2 gm. (39.1% yield) of 2-[(3-aminopropyl)methylamino]-4-morpholino-thieno[3,2-d] pyrimidine dihydrochloride which after crystallization from ethanol melted at 245–248° C.

By the same process, 2-[(2-cyanoethyl)ethylamino]-4-morpholino-thieno[3,2-d]pyrimidine and 2 - [(2-cyanoethyl)-n-butylamino] - 4-morpholino-thieno[3,2-]pyrimidine were hydrogenated using a Raney nickel catalyst to obtain 2-[(3-aminopropyl)ethylamino] - 4 - morpholino-thieno[3,2-d]pyrimidine dihydrochloride melting at 280° C. and 2-[(3-aminopropyl)-n-butylamino]-4-morpholino-thieno[3,2-d]pyrimidine dihydrochloride melting at 279–281° C. after crystallization from isopropanol.

EXAMPLE 12

A mixture of 2.56 gm. (0.01 mol) of 2-chloro-4-morpholino-thieno[3,2-d]pyrimidine and 7.68 gm. (0.03 mol) of 2-(p-toluene sulfonamido)-ethyl ethylamine was heated for 6 hours at 140° C. and after cooling, the light yellow solution was poured into water. The mixture was extracted with methylene chloride and the extracts were dried over sodium sulfate and evaporated to dryness. The residue was purified by chromatography over silica gel with elution with a mixture of benzene-acetone-methanol (60–25–15) and evaporation of the mixed solvent to obtain 4.0 gm. (87% yield) of 2-[2-(p-toluene sulfonamido)ethyl ethylamino]-4-morpholino-thieno[3,2-d]pyrimidine melting at 123–125° C. after crystallization from methanol. The free base was reacted with methanolic hydrochloric acid to obtain the corresponding hydrochloride salt melting at 249–251° C. after crystallization (from-methanol).

*Analysis.*—$C_{21}H_{28}ClN_5O_3S_2$; molecular weight=498.08. Calculated (percent): C, 50.64; H, 5.67; N, 14.06; Cl, 7.12; S, 12.87. Found (percent): C, 50.85; H, 5.74; N, 13.95; Cl, 7.19; S, 12.60.

A mixture of 4.6 gm. (0.01 mol) of 2-[2-(p-toluene sulfon amido)ethyl ethylamino] - 4 - morpholino-thieno[3,2-d]pyrimidine and 50 cc. of a 40% solution of hydrobromic acid in glacial acetic acid and 1.8 gm. (0.02 mol) of phenol were heated at 60° C. for 6 hours and then the solvent was distilled off under reduced pressure. The residue was added to water and the solution was made strongly acidic with hydrochloric acid. The aqueous phase was extracted with ethyl ether and then was made alkaline while cooling by the addition of potassium carbonate. The solution was extracted with methylene chloride and the methylene chloride was dried over sodium sulfate and evaporated to dryness. The oily residue was added to methanolic hydrochloric acid to obtain 1.2 gm. (32% yield) of 2 - [(2-aminoethyl)-ethylamino]-4-morpholino-thieno[3,2-d]pyrimidine dihydrochloride melting at 284–285° C. after crystallization from ethanol.

*Analysis.*—$C_{14}H_{23}Cl_2N_5OS$; molecular weight=380.27. Calculated (percent): N, 18.45; Cl, 18.65; S, 8.42. Found (percent): N, 18.25; Cl, 18.40; S, 8.23.

Using the same process, hydrobromic acid in glacial acetic acid was reacted with the appropriate thieno [3,2-d] pyrimidine to obtain the products of Table VI:

TABLE VI

| Products | Melting point (° C.) | Solvent of crystallization |
|---|---|---|
| 2-[(2-aminoethyl)methylamino]-6-methyl-4-morpholino-thieno[3,2-d]pyrimidine-2HCl. | 293–295 | Ethanol. |
| 2-[(2-aminoethyl)n-propylamino]-4-morpholino-thieno[3,2-d]pyrimidine-2HCl. | 273–275 | Methanol. |
| 2-[(2-aminoethyl)isopropylamino]-4-morpholino-thieno[3,2-d]pyrimidine-2HCl. | 278–280 | Ethanol. |
| 2-[(2-aminoethyl)-n-butyl-amino]-4-morpholino-thieno[3,2-d]pyrimidine-2HCl. | 271–274 | Do. |
| 2-[(3-aminopropyl)ethylamino]-4-morpholino-thieno[3,2-d]pyrimidine. 2HCl. | 280 | Do. |
| 2-[(3-aminopropyl)-n-propylamino]-4-morpholino-thieno[3,2-d]pyrimidine-2HCl. | 291–293 | Do. |

2-[(3 - benzamidopropyl)methylamino]-4-morpholino-thieno[3,2-d]pyrimidine was hydrolyzed by refluxing with concentrated hydrochloric acid to obtain a 34% yield of 2-[(3 - aminopropyl)methylamino]-4-morpholino-thieno [3,2-d]pyrimidine dihydrochloride melting at 245–248° C. after crystallization from a 1–5 mixture of ethanol-acetone.

*Analysis.*—$C_{14}H_{23}Cl_2N_5OS$; molecular weight=380.35. Calculated (percent): C, 44.20; H, 6.09; S, 8.43. Found (percent): C, 43.95; H, 6.18; S, 8.14.

EXAMPLE 13

A mixture of 2.87 gm. (0.01 mol) of 2-chloro-4-diethanolamino-7-methyl-thieno[3,2-d]pyrimidine prepared from diethanolamine and 2,4-dichloro-7-methyl-thieno-[3,2-d]pyrimidine) and 10 cc. of 1,2-diaminoethane were heated at 120° C. for 4 hours and the excess amine was distilled off in vacuo. The residue was purified by chromatography over silica gel with elution with a 9–1 mixture of methanol-concentrated ammonium hydroxide. The pure fractions were evaporated to dryness and the non-crystalline residue was dissolved in excess ethanolic hydrochloric acid and the solution was evaporated to dryness. The residue was crystallized from a 3–1 mixture of methanol-ethanol to obtain 2.6 gm. (68% yield) of 2-[(2-aminoethylamino)-4-diethanolamino - 7 - methyl-thieno[3,2-d] pyrimidine dihydrochloride melting at 235° C. (decomp.).

*Analysis.*—$C_{13}H_{23}Cl_2N_5O_2S$; molecular weight=384.34. Calculated (percent): C, 40.62; H, 6.03; N, 18.22. Found (percent): C, 40.45; H, 6.18; N, 18.11.

3.84 gm. of (0.01 mol) of 2-(2-aminoethylamino)-4-diethanolamino - 7 - methyl-thieno[3,2-d]pyrimidine dihydrochloride were dissolved in 50 cc. of concentrated sulfuric acid and the mixture was allowed to stand for 3 days at 20° C. in the absence of moisture. The reaction mixture was poured into a water-ice mixture and was then made alkaline with a 40% aqueous sodium hydroxide solution. The mixture was extracted several times with methylene chloride and the combined extracts were washed with water, dried over sodium sulfate and then added to etheral hydrochloric acid. The resulting precipitate of 2-(2-aminoethylamino) - 7 - methyl - 4 - morpholino-thieno[3,2-d] pyrimidine dihydrochloride was recovered by filtration, was washed with ether and crystallized from methanol to obtain 1.98 gm. (54% yield) of the said dihydrochloride melting at 335° C. (decomp).

*Analysis.*—$C_{13}H_{21}Cl_2N_5OS$; molecular weight=366.33. Calculated (percent): C, 42.70; H, 5.77; N, 19.10. Found (percent): C, 42.50; H, 5.88; N, 18.95.

Using the same procedure, the appropriate 4-diethanolamino - thieno[3,2 - d]pyrimidine dihydrochloride was treated with concentrated sulfuric acid to obtain the products of Table VII.

TABLE VII

| Product | Melting point (° C.) | Solvent of crystallization |
|---|---|---|
| 2-[(3-aminopropyl)ethylamino]-4-morpholino-thieno[3,2-d]pyrimidine. 2HCl. | 280 | Ethanol. |
| 2-[(5-aminopentyl)ethylamino]-4-morpholino-thieno[3,2-d]pyrimidine. 2HCl. | 236–238 | Ethyl acetate-methanol (3-1). |
| 2[(6-aminohexyl)methylamino]-4-morpholino-thieno[3,2-d]pyrimidine. 2HCl | 227–228 | Ethanol. |
| 2[(4-aminobutyl)n-butylamino]-4-morpholino-thieno[3,2-d]pyrimidine. 2HCl | 280 | Ethanol-acetone. |
| 2-[(2-aminoethyl)isopropylamino]-4-morpholino-thieno[3,2-d]pyrimidine. 2HCl. | 278–280 | Ethanol. |
| 2-[(2-aminoethylamino)-4-morpholino-thieno[3,2-d]pyrimidine. 2HCl. | ¹282–283 | |
| 2-(2-aminoethylamino)-6-methyl-4-morpholino-thieno[3,2-d]pyrimidine. 2HCl. | ¹309–311 | Methanol. |
| 2-[(2-aminoethyl)methylamino]-4-morpholino-thieno[3,2-d]pyrimidine. 2HCl. | ¹275 | Ethanol. |
| 2-(2-aminopropylamino)-4-morpholino-thieno[3,2-d]pyrimidine. 2HCl. | ¹214–216 | Do. |
| 2-(3-aminopropylamino)-4-morpholino-thieno[3,2-d]pyrimidine. 2HCl. | ¹255–258 | Do. |
| 2-(4-aminobutylamino)-4-morpholino-thieno[3,2-d]pyrimidine. 2HCl. | ¹245–247 | Methanol-methyl ethyl ketone (1–2). |
| 2-(6-aminohexylamino)-4-morpholino-thieno[3,2-d]pyrimidine. 2HCl. | ¹280–282 | Ethanol-acetone (1–1). |
| 2-[(5-aminopentyl)methylamino]-4-morpholino-thieno[3,2-d]pyrimidine. 2HCl. | 255–257 | Ethanol-acetone (1–2). |

¹ Decomposes.

EXAMPLE 13a

Using the procedure of Example 13, 2-(2-aminoethylamino)-4-[N-(2-hydroxyethyl) - 2 - hydroxypropylamino] thieno[3,2-d]pyrimidine dihydrochloride was treated with concentrated sulfuric acid to obtain 2-(2-aminoethylamino) - 4 - (2-methylmorpholino)-thieno[3,2-d]pyrimidine dihydrochloride melting at 276–278° C. (decomp.) after crystallization from ethanol.

EXAMPLE 13b

2-[5 - (p-toluene sulfonamido-pentyl)-methylamino]-4-diethanolamino-thieno[3,2-d]pyrimidine was treated with concentrated sulfuric acid and the resulting product was hydrolyzed with hydrobromic acid in glacial acetic acid in the presence of a small amount of phenol at 60° C. to obtain 2-[(5-aminopentyl)methylamino] - 4 - morpholino-thieno[3,2-d]pyrimidine dihydrochloride melting at 255–257° C.

PHARMACOLOGICAL EXAMPLES

Example A

Tablets with 30 mg. of 2-(2-aminoethylamino)-4-morpholino-thieno[3,2-d]pyrimidine dihydrochloride.

COMPOSITION

| 1 tablet contains | Mg. |
|---|---|
| 2 - (2 - aminoethylamino) - 4 - morpholino-thieno [3,2-d]pyrimidine dihydrochloride | 30.0 |
| Lactose | 38.0 |
| Potato starch | 26.0 |
| Polyvinylpyrrolidone | 5.0 |
| Magnesium stearate | 1.0 |
| | 100.0 |

COMPOUNDING PROCEDURE

The active ingredient was mixed with lactose and potato starch, moistened equally with a 20% ethanolic solution of the polyvinylpyrrolidone and granulated through a 1.5 mm. mesh screen. The granulate was dried at 45° C. and again passed through a 1.0 mm. mesh screen and the thus obtained granulate was then mixed with magnesium stearate and pressed into flat 7 mm. tablets weighing 100 mg. each.

Example B

Coated tablets with 15 mg. of 2-(4-aminobutylamino)-4-morpholino-thieno[3,2-d]pyrimidine dihydrochloride.

COMPOSITION

| 1 core of coated tablet contains | Mg. |
|---|---|
| 2 - (4 - aminobutylamino) - 4 - morpholino-thieno [3,2-d]pyrimido dihydrochloride | 15.0 |
| Lactose | 14.0 |
| Corn starch | 8.0 |
| Polyvinylpyrrolidone | 2.5 |
| Magnesium stearate | 0.5 |
|  | 40.0 |

COMPOUNDING PROCEDURE

The active ingredient was mixed with lactose and corn starch, moistened equally with a 20% ethanolic solution of the polyvinylpyrrolidone and granulated through a screen of 1.5 mm. mesh size. The granulate was dried at 45° C. and again passed through a 1.0 mm. mesh screen. The thus obtained granulate was mixed with magnesium stearate and pressed into convex 5.0 mm. cores of coated tablets weighing 40 mg. The thus obtained cores were coated according to known methods with a shell consisting essentially of sugar and talcum. The finished coated tablets were polished by means of bees wax and weighed 70.0 mg. each.

Example C

Ampoules with 10 mg. of 2-(2-aminoethylamino)-4-morpholino-thieno[3,2-d]pyrimidine-dihydrochloride.

COMPOSITION

| 1 ampoule contains | Mg. |
|---|---|
| 2-(2-aminoethylamino) - 4 - morpholino-thieno [3,2-d]pyrimidine dihydrochloride | 10.0 |
| Polyethylene glycol 600 | 100.0 |
| Distilled water ad 2.0 cc. | |

COMPOUNDING PROCEDURE

The polyethylene glycol and the active ingredient were dissolved in boiled, distilled water cooled while introducing nitrogen. The solution was filled up to the indicated volume with distilled water and filtered sterile. All work must be effected in diffuse light. The liquid was poured into brown 2 cc. ampoules while nitrogen gasing and sterilized for 20 minutes at 120° C.

EXAMPLE D

Drops with 10 mg. of 2-(4-aminobutylamino)-4-morpholino-thieno-[3,2-d]pyrimidine dihydrochloride.

COMPOSITION

| 1 ml. of drop solution contains | | |
|---|---|---|
| 2-(4-aminobutylamino) - 4 - morpholino-thieno-[3,2-d]pyrimidine dihydrochloride | mg. | 10.0 |
| Cane sugar | mg. | 350.0 |
| Sorbic acid | mg. | 1.0 |
| Cocoa essence | mg. | 50.0 |
| Ethyl alcohol | cc. | 0.2 |
| Polyethylene glycol 600 | cc. | 0.1 |
| Distilled water ad 1.0 cc. | | |

COMPOUNDING PROCEDURE

The sorbic acid was dissolved in alcohol and mixed with the same quantity of water. Then the active ingredient was dissolved in this solution (solution 1). The sugar was dissolved in the remaining water (solution 2).

Solution 2, polyethylene glycol 600 and the cocoa essence were added to solution 1 while stirring and the resulting solution was filtered through a suitable filter. 1 ml. of drop solution contained 10 mg. of 2-(4-aminobutylamino) - 4 - morpholino-thieno[3,2-d]pyrimidine dihydrochloride. The production, filling and storage of the solution must be done under a nitrogen atmosphere.

PHARMACOLOGICAL STUDY

Inhibition of Platelet Aggregation

The inhibition of platelet aggregation was determined by three different methods. The first method was that of K. Breddin [Schweiz. Med. Wschr. Vol. 95, 655–660 (1965)] wherein human blood plasma rich in platelets was, after the addition of the test compound, slowly rotated in a water bath. A siliconized glass holder was subsequently covered with the rotated plasma, washed, fixed and colored. The inhibition of the aggregation of the platelets was determined microscopically.

The second method for the determination of the inhibition of platelet-aggregation was that of Born et al. [J. Physiol. Vol. 170, 397 (1964)]. The aggregation was measured in the plasma rich in platelets of healthy test persons. The decrease of the optical density in the suspension of platelets was measured and registered photometrically after addition of adenosin-diphosphate ($10^{-5}$ mols per liter). The active substances were each added 10 minutes before the addition of adenosin-diphosphate.

The third test for aggregation of platelets was that of Morris [1. Internationales Symposion uber Stoffwechsel und Membranpermeabilitat von Erythrozyten und Thrombozyten, Wien 1968, E. Deutsch, E. Gerlach, K. Moser; Georg Thieme-Verlag Stuttgart]. Human citrated blood was brought into contact for 30 seconds with 1 gm. of glass-balls. After the contact the blood was allowed to stand for 1 hour to render possible the desaggregation of the reversible aggregates. The platelets in the plasma were counted microscopically before and after the contact with glass-balls.

According to these 3 test methods, the following substances showed a good inhibition of the aggregation of platelets still at a concentration of $10^{-5}$ mols per liter:

2-[(5-aminopentyl)ethylamino]-4-morpholino-thieno-[3,2-d]pyrimidine dihydrochloride.

2-[(5-aminopentyl)methylamino]-4-morpholino-thieno-[3,2-d]pyrimidine dihydrochloride.

2-[(3-aminopropyl)ethylamino]-4-morpholino-thieno-[3,2-d]pyrimidine dihydrochloride.

2-[(2-aminoethyl)ethylamino]-4-morpholino-thieno-[3,2-d]pyrimidine dihydrochloride.

2-(2-aminoethylamino)-4-morpholino-thieno[3,2-d]pyrimidine dihydrochloride.

2-(3-aminopropylamino)-4-morpholino-thieno[3,2-d]pyrimidine dihydrochloride.

2-(4-aminobutylamino)-4-morpholino-thieno[3,2-d]pyrimidine dihydrochloride.

2-[(2-aminoethyl)methylamino]-4-morpholino-thieno-[3,2-d]pyrimidine dihydrochloride and 2-(2-aminopropylamino)-4-morpholino-thieno[3,2-d]pyrimidine dihydrochloride.

Various modifications of the compositions and methods of the invention may be made without departing from the spirit or scope thereof and it is to be understood that the invention is to be limited only as defined in the appended claims.

We claim:

1. A compound of the formula

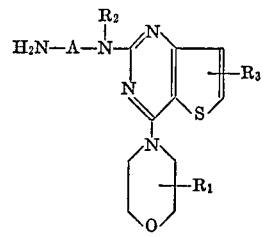

wherein $R_1$ is hydrogen or methyl, $R_2$ is hydrogen, methyl or ethyl, $R_3$ is hydrogen, 6-methyl or 7-methyl, and A is straight or branched alkyl of 2 to 6 carbon atoms, or a non-toxic, pharmaceutically acceptable acid addition salt thereof.

2. A compound of claim 1 which is selected from the group consisting of 2-[(5-aminopentyl)-ethylamino]-4-morpholino-thieno[3,2-d]pyrimidine and its non-toxic, pharmaceutically acceptable acid addition salts.

3. A compound of claim 1 which is selected from the group consisting of 2-[(5-aminopentyl)-methylamino]-4-morpholino-thieno[3,2-d]-pyrimidine and its non-toxic, pharmaceutically acceptable acid addition salts.

4. A compound of claim 1 which is selected from the group consisting of 2-[(3-aminopropyl)-ethylamino]-4-morpholino-thieno[3,2-d]-pyrimidine and its non-toxic, pharmaceutically acceptable acid addition salts.

5. A compound of claim 1 which is selected from the group consisting of 2-[(2-aminoethyl)-ethylamino]-4-morpholino-thieno[3,2-d]-pyrimidine and its non-toxic, pharmaceutically acceptable acid addition salts.

6. A compound of claim 1 which is selected from the group consisting of 2-(2-aminoethylamino)-4-morpholino-thieno[3,2-d]pyrimidine and its non-toxic, pharmaceutically acceptable acid addition salts.

7. A compound of claim 1 which is selected from the group consisting of 2-(3-aminopropylamino)-4-morpholino-thieno[3,2-d]pyrimidine and its non-toxic, pharmaceutically acceptable acid addition salts.

8. A compound of claim 1 which is selected from the group consisting of 2-(4-aminobutylamino)-4-morpholino-thieno[3,2-d]pyrimidine and its non-toxic, pharmaceutically acceptable acid addition salts.

9. A compound of claim 1 which is selected from the group consisting of 2-[(2-aminoethyl)-methylamino]-4-morpholino-thieno[3,2-d]-pyrimidine and its non-toxic, pharmaceutically acceptable acid addition salts.

10. A compound of claim 1 which is selected from the group consisting of 2-(2-aminopropylamino)-4-morpholino-thieno[3,2-d]pyrimidine and its non-toxic, pharmaceutically acceptable acid addition salts.

References Cited

Thomae, Chemical Abstracts, Vol. 67, p. 100149g (1967).

DONALD G. DAUS, Primary Examiner

J. TOVAR, Assistant Examiner

U.S. Cl. X.R.

260—256.5 R, 332.2 A; 429—248

PO-1050
(5/69)

UNITED STATES PATENT OFFICE
CERTIFICATE OF CORRECTION

Patent No. 3,838,121      Dated Sept. 24, 1974

Inventor(s) EBERHARD WOITUN, BERTHOLD NARR and WOLFGANG SCHROTER

It is certified that error appears in the above-identified patent and that said Letters Patent are hereby corrected as shown below:

Col. 7, line 20 - correct "$C_{11}H_{13}N_3O_3S_2$"

to read --$C_6H_2Cl_2N_2S$--;

- correct "299.38" to read --205.08--;

line 60 - correct "pyrimidone" to read --pyrimidine--;

line 70 - correct "[e,2-d]-"

to read --(3,2-d)-pyrimidine--.

Col. 8, line 34 - correct "$C_9$" to read --$C_8$--.

Col. 11, line 56 - correct "5.2" to read --5.12--;

line 74 - insert closing parenthesis after "yield".

Col. 15, line 9 - correct "has" to read --was--.

Col. 16, line 23 - insert --d-- after "3,2-".

Signed and sealed this 24th day of June 1975.

(SEAL)
Attest:

RUTH C. MASON
Attesting Officer

C. MARSHALL DANN
Commissioner of Patents
and Trademarks